United States Patent
Sugawa et al.

(10) Patent No.: US 6,368,019 B2
(45) Date of Patent: *Apr. 9, 2002

(54) METHOD FOR SOIL REMEDIATION

(75) Inventors: Etsuko Sugawa; Masahiro Kawaguchi, both of Atsugi (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/047,339

(22) Filed: Mar. 25, 1998

(30) Foreign Application Priority Data

| Mar. 26, 1997 | (JP) | 9-073806 |
| Jan. 30, 1998 | (JP) | 10-018928 |
| Mar. 20, 1998 | (JP) | 10-071995 |

(51) Int. Cl.⁷ ............................................. B09C 1/10
(52) U.S. Cl. ........................... 405/128.45; 405/129.6; 588/249
(58) Field of Search ................. 405/128, 128.45, 405/128.7, 129.6; 588/249; 435/262.5; 210/747; 166/246

(56) References Cited

U.S. PATENT DOCUMENTS

| 4,749,491 A | * | 6/1988 | Lawes et al. ............... 210/610 |
| 4,842,448 A | * | 6/1989 | Koerner et al. ............. 405/258 |
| 5,286,140 A | * | 2/1994 | Mather ........................ 405/128 |
| 5,375,944 A | * | 12/1994 | Kotani et al. ............... 405/128 |
| 5,384,048 A | * | 1/1995 | Hazen et al. ................ 210/605 |
| 5,435,666 A | * | 7/1995 | Hassett et al. .............. 405/128 |
| 5,577,558 A | * | 11/1996 | Abdul et al. ................ 166/246 |
| 5,658,093 A | * | 8/1997 | Kawabata .................... 405/128 |
| 5,730,550 A | | 3/1998 | Andersland et al. ........ 405/128 |
| 5,753,003 A | | 5/1998 | Sugawa et al. .................. 71/6 |

FOREIGN PATENT DOCUMENTS

| EP | 0059020 | 9/1982 |
| WO | WO 96/00624 | 1/1996 |

* cited by examiner

*Primary Examiner*—David Bagnell
*Assistant Examiner*—Zakiya Walker
(74) *Attorney, Agent, or Firm*—Fitzpatrick, Cella, Harper & Scinto

(57) ABSTRACT

The present invention provides a method for remedying soil containing a region polluted with a pollutant which comprises a step of injecting into the soil a liquid containing a microorganism having an activity to decompose the pollutant or a liquid containing the microorganism and an activation agent for the microorganism decomposing the pollutant, wherein the step comprises isolating the region from surrounding soil with a barrier made of a material that does not allow the pollutant, the microorganism, the activation agent or water to pass through, and replacing void water in the isolated region with the liquid.

14 Claims, 7 Drawing Sheets

METHOD FOR SOIL REMEDIATION

BACKGROUND OF THE INVENTION

1. Field of the Invention

The present invention relates to a method for remedying polluted soil. In more detail, this invention relates to a method for remedying polluted soil in which the pollutant in the polluted region is decomposed by microbial activities.

2. Related Background Art

Recent rapid developments in science and technology have produced a vast amount of chemicals and chemical products. These substances are polluting nature slowly accumulating in the environment. Environmental pollution is a serious problem spreading all over the world since water and the air are circulating in the environment. Examples of hitherto known pollutants are chlorinated organic compounds (such as dichloroethylene (DCE), trichloroethylene (TCE), tetrachloroethylene (PCE) and dioxin), aromatic compounds (such as toluene, xylene and benzene) and fuels such as gasoline. Chlorinated aliphatic hydrocarbon compounds (such as dichloroethylene, trichloroethylene and tetrachloroethylene) are especially used in a large amount as a solvent for cleaning precision machine members and for dry cleaning, and pollution of soil and ground water by these solvents have been revealed. In addition, these organic compounds are so volatile that they may cause air pollution. It is also pointed out that these organic compounds are teratogenic and carcinogenic, so that it becomes evident that they seriously affect living creatures. Accordingly, an urgent theme is not only to cut off the pollution sources but also to clean the soil and ground water already polluted with these organic compounds.

One of the conventional methods for remedying the soil polluted with chlorinated organic compounds is, for example, to scoop out the polluted soil and subject it to a heat treatment. Although this method enables complete elimination of pollutants from the dug up soil, it requires much expenses and a long working period for turning up the soil. It is practically impossible to take out the polluted soil situated deep under the ground, limiting the application range of this method. In addition, the chlorinated organic compounds released from the dug up polluted soil should be recovered by adsorption onto an adsorbent such as activated charcoal to prevent secondary air pollution, and the used activated charcoal requires further processing. For example, when the used activated charcoal which adsorbed chlorinated compounds such as DCE, TCE and PCE is incinerated, more poisonous by- products such as phosgene may be generated. Accordingly, the final processing cost is predicted to be enormous because of the necessary additional steps to make the recovered pollutants harmless.

Vacuum-extraction of the pollutants from the polluted soil or use of a microorganism having pollutant-degrading ability can solve one of the problem of the above-mentioned method, i.e., limitations of the treating region. These methods do not require to dig up the soil and can purify the soil at the location where it is (called "in situ" hereinafter). Actually, these method are cheap and simple compared with the foregoing dig-up method; only small-scale work is required such as boring a well for introducing a vacuum extraction pipe or pollutant-degrading microorganisms into the polluted soil. The vacuum extraction method has problems that it cannot remove chlorinated organic compounds in a low concentration of several ppm or less efficiently, and that further treatment of the recovered chlorinated organic compounds is required as in the above-mentioned method.

On the other hand, the pollutant in soil can be degraded into harmless substance(s) by the microbial remediation method using microorganisms native or foreign to the soil. Thus, the microbial method dispenses the detoxification treatment of the recovered pollutant that is indispensable in the foregoing two methods. In addition, this method is highly efficient in degrading pollutant of a relatively low concentration.

Accordingly, now the microbial remediation method is attracting attentions.

When the native microorganisms (inherently living in the region to be remedied) are used in the remediation method, it is necessary to supply the soil region to be treated with activating agents such as inducers to induce degradation activity of the native microorganisms, nutrients to enhance the microbial degradation activity, oxygen and growth stimulating agents. When a foreign microorganism having the pollutant-degrading ability is used, it is necessary to introduce into the soil the microorganism and if necessary activating agents for that microorganism.

In both cases, it is preferable to introduce the microorganism or the activating agent in the soil as even as possible. Usually, soil structure is not so uniform as to allow uniform diffusion of a liquid containing the microorganism and activating agent into the soil. For the purpose of solving these technical problems, the inventors of the present invention have disclosed an art for uniform distribution in the soil of the injected liquid containing a microorganism and a microbial activating agent. Japanese Laid-Open Patent Application No. 8-224566.

SUMMARY OF THE INVENTION

The inventors of the present invention has found that when a liquid containing a microorganism and an activation agent is injected into the soil, a portion of the pollutant present in the voids (pores) of the soil may be pushed out according to the injection, and move along the diffusion of the liquid, so that the polluted region may be expanded by the liquid injection. This tendency is more evident with volatile pollutants such as DCE, TCE and PCE. Therefore, enlargement of the polluted region due to the liquid injection should be prevented as much as possible irrespective of the pollutant concentrations, especially in In situ remediation of the soil. As a conclusion, a technical development has been required to solve this problem.

Further studying how to solve the technical problems hitherto described, the inventors of the present invention found a method for remedying the soil which completes remediation of the soil in the closed space by isolating the polluted region in situ from the surrounding soil, or substantially enclosing the soil within a closed space.

The object of the present invention, based on the findings of the inventors of the present invention, is to provide a method for carrying out high remediation of the soil while preventing enlargement of the polluted region.

In accordance with one embodiment of the present invention, there is provided a method for remedying soil containing a region polluted with a pollutant which comprises a step of injecting into the soil a liquid containing a microorganism having an activity to decompose the pollutant or a liquid containing a microorganism having ability to decompose the pollutant and an activation agent for the microorganism, wherein the step comprises:

isolating the region from surrounding soil with a barrier made of a material that does not allow the pollutant, the microorganism, the activation agent or water to pass through; and replacing void water in the isolated region with said liquid.

In accordance with another embodiment to achieve the foregoing object, the present invention provides a method for remedying soil containing a region polluted with a pollutant comprising a step of injecting into the soil a liquid containing a microorganism having an activity to decompose the pollutant or a liquid containing a microorganism having ability to decompose the pollutant and an activation agent for the microorganism, wherein the step comprises:

separating the region from the surrounding soil with a barrier made of a material that does not allow the pollutant, the microorganism, the activation agent or water to pass through; and injecting into the region the liquid in an amount 1.1 times or more a volume of the void of the isolated region.

In accordance with the other embodiment, the present invention provides a method for remedying a soil polluted with a pollutant comprising a step of taking the soil in a treatment vessel to decompose the pollutant by introducing a liquid containing a microorganism capable of decomposing the pollutant or a liquid containing the microorganism and an activation agent for the microorganism, wherein the treatment vessel is composed of a material that does not allow the pollutant, microorganism, the activation agent or water to pass through, and the liquid is injected to replace void water in the soil in the vessel with the liquid.

DETAILED DESCRIPTION OF THE PREFERRED EMBODIMENTS

Figure 1:
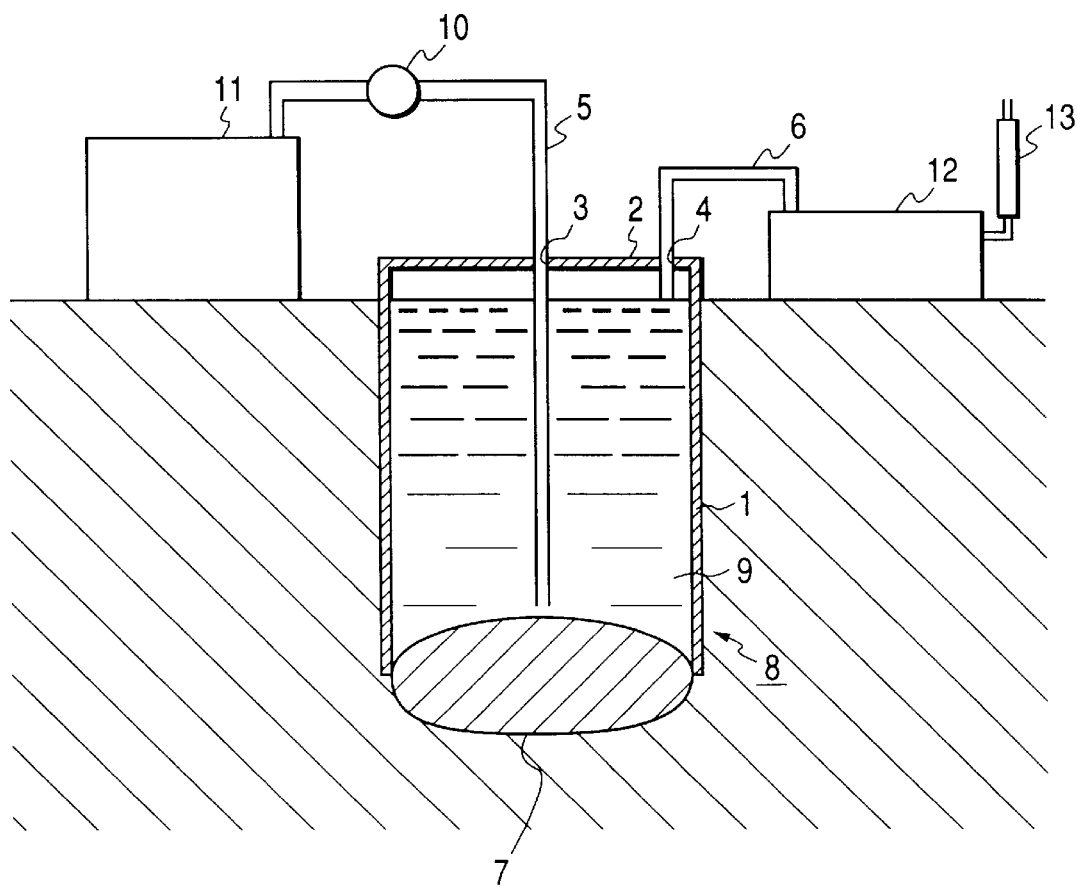
FIG. 1 is a schematic drawing of a treatment system.

With reference to the schematic drawing of FIG. 1, a remediation system for the polluted soil is explained. The treatment vessel 8 for pollutant decomposition installed at a site of the soil pollution is composed of a side wall 1, a bottom 7 and a lid 2. The treatment vessel 8 contains the polluted soil to isolate the soil from the surrounding soil. The lid 2 is provided with two opening 3 and 4, and a liquid injection pipe 5 is inserted into the vessel 8 though the opening 3 to inject a liquid containing a microorganism or a liquid containing a microorganism and an activation agent into the soil for soil remediation. One end of the liquid injection pipe 5 is inserted into the soil 9 in the treatment vessel 8 to inject the liquid into it. The other end of the pipe 5 is connected to a tank 11 containing the liquid. The liquid is injected into the soil 9 with a pump 10 disposed on way of the pipe 5.

A discharge pipe 6 is inserted into the treatment vessel 8 through an opening 4 to lead the pollutant or the overflowing liquid into a pollutant decomposition apparatus 12, where the pollutant retained in the soil void is pushed out by an applied pressure due to the liquid injection from the injection pipe 5. A trap 13 is provided to prevent the discharge of the pollutant from the pollutant decomposition apparatus 12 into the air.

It is preferable to construct the pollutant decomposition treatment vessel 8 so as to enclose the pollution source or the highly polluted soil in situ (where the soil to be treated exists). This enables not only efficient remediation of the soil but also prevention of the diffusion of the pollution. When there is a flow of ground water, it is effective in preventing spread of pollution to install the treatment vessel as upstream as possible. The shape and construction method of the side wall 1 is not limited as long as the wall is made of a material not permeable by water, microorganisms and pollutants. For example, an iron pipe may be driven into the polluted soil to form a iron pipe side wall 1, or the side wall 1 may be formed by driving four iron plates into the soil as side walls.

The bottom 7 can be formed, for example, by injecting a soil hardening agent to harden the soil at the bottom. To form the bottom, after the steel pipe is driven into the treatment site or after four steel plates were driven into the site, a soil hardening agent is injected into the bottom of the region in the pipe or surrounded by the steel plates. Examples of the soil hardening agent are water glass, rapidly hardening cement, normal cement and special purpose cement, which may be properly selected according to the conditions of the site or the purpose. Admixtures such as montmorillonite, calcium, an anionic polymer surface active agent and/or a fluidity accelerating agent may be added to the soil hardening agent. When the pollutant is a volatile compound such as a chlorinated aliphatic hydrocarbon compound (for example, dichloroethylene, trichloroethylene or tetrachloroethylene), it is preferable to use an water glass type soil hardening agent not permeable by these compounds.

Examples of the injection method of the hardening agent into the ground are the CCP method, jet-grout method and roden jet pile method. Although these methods can be appropriately selected depending on the region of the polluted soil and conditions of the ground, CCP method is preferable since this method enables injection of the soil hardening agent without outflow of the polluted soil, thus dispensing the treatment of the outflow.

Figure 2:
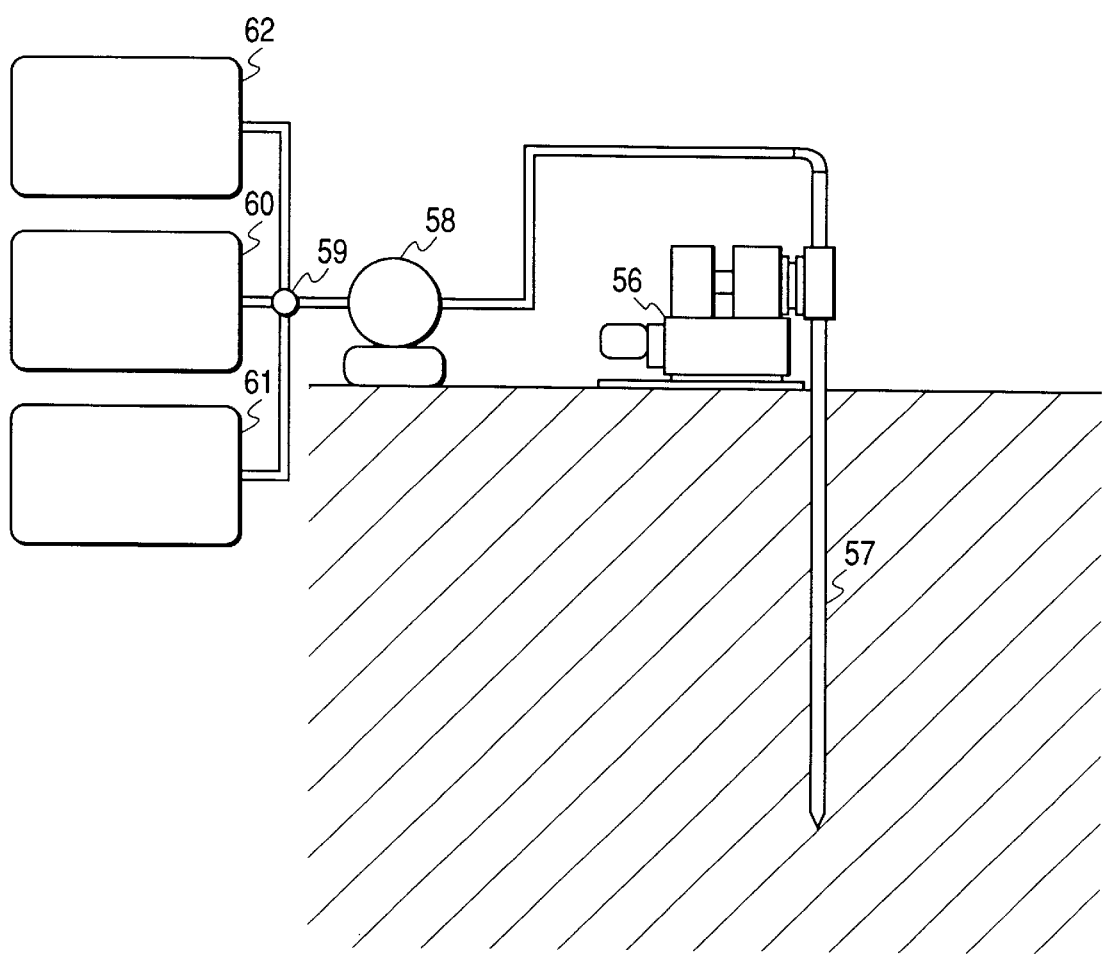
FIG. 2 is an illustrative drawing of the method for hardening the soil.

The CCP method in forming the bottom of the polluted soil to be treated by injecting the hardening agent at a high pressure is described referring to FIG. 2. A rod 57 to which a special jet equipment is mounted is attached to a boring machine 56, and the other end of the special jet equipment is connected to a circulation water tank 60 via a super-high pressure pulse pump 58 and a valve 59. The ground is bored to a depth of injection position with a rotation speed and a stroke number suitable for the soil conditions, while continuously sending the circulation water by keeping the pump discharge pressure at, for example, 30 Kgf/cm$^2$ or less. When reached to a desired depth, the rod is disconnected from the circulation water tank and connected to the soil hardening agent tank 61 by valve operation to inject the soil hardening agent, for example, at a rotation speed of 10 to 20 rpm and a discharge pressure of 200 to 400 Kgf/cm$^2$. The pollutant decomposing microorganism may be injected, for example, from the rod connected to the microorganism storage tank 62 and pump 58, or it may be injected by driving a separate injection pipe into the treatment region.

When the construction site has a water impermeable layer such as a rock-bed, the layer itself may be used as the bottom 7.

It is preferable that the top of the treatment vessel is a sealed structure by providing a lid made of the same material not permeable by the pollutant as the side wall, not to release into the air the pollutant rising to the earth surface forced by the rising front of the injected liquid. Diffusion of the pollutant into the environment from the treatment vessel 8 due to injection of the liquid can be almost perfectly prevented by constructing such a treatment vessel at the site of the pollution. It can also prevent the pollutant-decomposing microorganism and the activation agent such as a nutrient or an inducer for the microorganism from diffusing into the environment.

Examples of the decomposition apparatus 12 to decompose the pollutant extruded from the soil 9 are a bioreactor filled with a pollutant-decomposing microorganism immobilized on a carrier, a bioreactor containing a liquid containing a pollutant-decomposing microorganism to which polluted gas or polluted soil water is introduced, or a chemical decomposition apparatus using ultraviolet light or iron.

Application of the method according to one embodiment of the present invention to a remediation method in which microorganism is introduced into the soil containing the pollutant will be explained hereinafter.

The pollutant-degradable microorganism grown in the fermentation tank 11, together with a liquid medium, is introduced into the pollutant decomposition treatment vessel 8 through the injection pipe 5. The injection position and injection method may be properly selected depending on the soil texture and consolidation. For example, the liquid medium can be sent up from the bottom of the treatment vessel using a pump, or it can flow down from the top of the treatment vessel by hydrostatic pressure. The liquid medium to be injected into the soil may contain an activation agent for the microorganism. As the activation agent, there is a growth medium containing nutrients for the microorganism or an inducer for the microbial expression of the pollutant-degrading activity.

When the pollutant is a volatile compound such as DCE, TCE or PCE, it is preferable to fill the treatment vessel with the liquid medium containing microorganism by injecting it from the bottom of the treatment vessel, so as to achieve soil remediation more efficiently. The volatile pollutant retained in the soil void is pushed up by the liquid front, and part of the pollutant moves toward the earth surface to finally seep from the surface as a gas or mixed with the liquid. According to the embodiment of the present invention, however, the extruded pollutant from the soil by the injected liquid will be guided to the pollutant decomposition apparatus 12 through the pipe 6 to be decomposed there. The pollutant remaining in the soil void not excluded by the injected liquid is decomposed by the microorganism injected into the soil. Thus, a much higher remediation of the soil is attained according to the embodiment of the present invention. The number of the injection port is not limited to one so long as the microorganism can be distributed in the vessel as uniform as possible. When a plurality of the injection ports are used, however, it is preferable that the ports are disposed, for example, upward to the earth surface so that the pollutant driven by the injection front can be trapped securely. It is also desirable that the position and shape of the drainage port for the overflow is properly devised depending on the injection method.

The microorganism to be injected into the treatment vessel has an activity to degrade the pollutant. For example, when the pollutant is an aromatic compound such as phenol or a halogenated aliphatic hydrocarbon compound such as DCE, TCE or PCE, a bacterial strain such as *Pseudomonas cepacia* strain KK01 (FERM BP-4235), strain J1 (FERM BP-5102), strain JM1 (FERM BP-5352), strain JMC1 (FERM BP-5960), strain JM2N (FERM BP-5961), strain JM6U (FERM BP-5962) and strain JM7 (FERM BP-5963) can be used. When the pollutant is a petroleum fuel, the present invention can be practiced using, for example, an Alcaligenes species, strain SM8-4L (FERM, P-13801).

It is preferable that the microorganism for the injection is in a state having high pollutant-degrading activity by cultivation. Since the microorganism usually shows the highest degradation activity to the pollutant in its logarithmic growth phase, it is preferable to introduce the microorganism in the logarithmic growth phase into the soil containing the pollutant.

Meanwhile, degrading chlorinated aliphatic hydrocarbon compounds, the microorganism is often damaged by the intermediate products. In such a case, the higher the concentration of the pollutant is, the more seriously the microorganism is damaged accompanied by the decrease in decomposition activity. One can solve such a problem according to the method of the present invention, that is, when the soil to be treated contains a high concentration of a pollutant in a treating vessel, an excess amount of a liquid medium containing the pollutant-degrading microorganism is injected into the vessel through the injection pipe 5 to fill all the void in the soil with the medium, thereby extruding the inherent soil water from the soil in the vessel. Since a liquid medium injected into the soil migrates through the soil while partly diluted with the inherent soil water, when the liquid medium is injected into the treatment vessel in a volume larger than the total soil void volume in the treatment vessel, it pushes out the inherent void water from the soil void and further pushes out the void water diluted with the liquid medium. Thus, extruding water containing the pollutant in a high concentration from the soil to be treated, which decreases the concentration of the pollutant in the soil thus lessens the damage to the microorganism. This also enables uniform distribution of the liquid medium into the soil in the treatment vessel.

The optimum injection amount of the liquid medium containing the microorganism depends on the soil properties, e.g., moisture content of the soil, it is preferable that the injection volume is 1.1 times or more, more preferably 1.2 times or more, the total volume of the soil void. When the injection volume is determined as described above, a part of the pollutant present in a high concentration in the soil is washed out along with the overflow of the injected medium, thereby decreasing the pollutant concentration in the soil. This procedure lessens the damage of the microorganism due to the pollutant itself or its intermediate products in degradation, enabling treatment of the region containing the pollutant in a high concentration.

The volume of the void ($Vv$) of the soil in a given region can be determined by the following equation (1):

$$Vv = V - 100 \cdot W/((100+\omega) \cdot \gamma s) \tag{1}$$

In the equation (1), V is the total volume of the soil, W is the total weight of the soil, $\omega$ is the moisture content of the soil and $\gamma s$ is the specific gravity of the soil particles ( of the solid matter). The total weight of the soil can be determined by multiplying the weight of a unit volume by the volume of the soil of the region, the former being determined by a conventional method (for example, a direct measurement method or a replacement measurement method).

The moisture content of the soil is determined, for example, as follows. A prescribed amount of soil is taken from the soil and placed in a watch glass to weigh the total weight (Wt) (the sum of the weights of the watch glass (Wp), the soil particles (dry weight) (Ws) and moisture contained in the soil sample (Ww)). After drying the soil sample at about 110° C. for 24 hours, it is weighed again, the weight Wa=Wp+Ws. Therefore, the moisture content of the soil sample ($\omega$) is calculated as follows:

$$\omega = 100Ww/Ws = 100(Wt-Wa)/(Wa-Wp)$$

The specific gravity of the soil particles is determined, for example, as follows. A pycnometer of an inner volume of Vp and of a weight of Wp is filled with distilled water and its weight (Wc) is measured, where $Wc=Wp+\gamma_w YP$ ($\gamma_w$ represents the weight of a unit volume of water). Then, this pycnometer is filled with the soil sample and water. After thoroughly deaerated, the total weight (Wt) is expressed by the following equation (2):

$$Wt=Wp+(Vp-Vs)\gamma_w+Ws \quad (2)$$

where Vs is the volume of the soil particles (solid) in the soil sample and Ws is the dry matter weight of the soil sample. The specific gravity (Gs) determined by dividing the weight of the unit volume of the sample soil $\gamma s$ (=Ws/Vs) by the weight of the unit volume of water is generally used as the specific gravity of the soil. Accordingly, the above equation (2) can be converted to:

$$Wt = Wp + (Vp - (Ws/Gs\gamma_w))\gamma_w + Ws \quad (3)$$
$$= Wc + (1 - 1/Gs)Ws$$

Thus, after the soil sample is taken out from the pycnometer and dried to determine the dry matter weight Ws, the specific gravity of the sample soil can be determined using the following equation (4).

$$Gs=Ws/(Ws+Wc-Wt) \quad (4)$$

It is desirable to collect the soil samples from a plurality of places for determining the void volume of the isolated soil region, since construction of the soil isolated by the barrier is not always uniform. The average of the soil void volumes of the samples taken from a plurality of places may be used as the void volume of the isolated soil. When the value of the soil void volume varies greatly among samples, it is preferable to increase the sampling number. When the presence of soil layers containing soil particles of different nature is predicted or known in the isolated soil region, one can investigate the soil layer constitution previously to determine respective soil void volume, and use the sum of the void volumes of soil layers as the total soil void volume.

When a microorganism showing the highest activity and in its logarithmic growth phase is used, the cells consume a large amount of oxygen in the soil of the treatment vessel. Accordingly, the oxygen concentration in the soil may rapidly decrease immediately after the microorganism is introduced. Such decrease in oxygen concentration may cause decrease in pollutant-decomposing activity of the microorganism. Therefore, for effective remediation of the soil, it is preferable to aerate the liquid medium to be injected with the microorganism into the treatment vessel, with a sufficient amount of oxygen or air. Otherwise, when the liquid medium to be injected into the soil contains some nutrients as an activation agent for the growth of the microorganism, it is effective in soil remediation to lower the nutrient concentration in order to suppress the microbial growth in the soil, or to eliminate the carbon source for the microorganism to substantially halt the growth of the microorganism in the soil.

As hitherto described, according to one embodiment of the present invention, an environment polluted with a high concentration of a pollutant can be effectively remedied by using a microorganism. It can also suppress the efflux of the pollutant, the microorganism and the activation agent for the microorganism outside the environment to be remedied. According to the other embodiment of the present invention, more improved remediation of the polluted environment is possible in addition to the foregoing advantages.

Although the present invention will be described in detail referring to the examples, it is by no means limited thereto.

EXAMPLE 1

Figure 3:
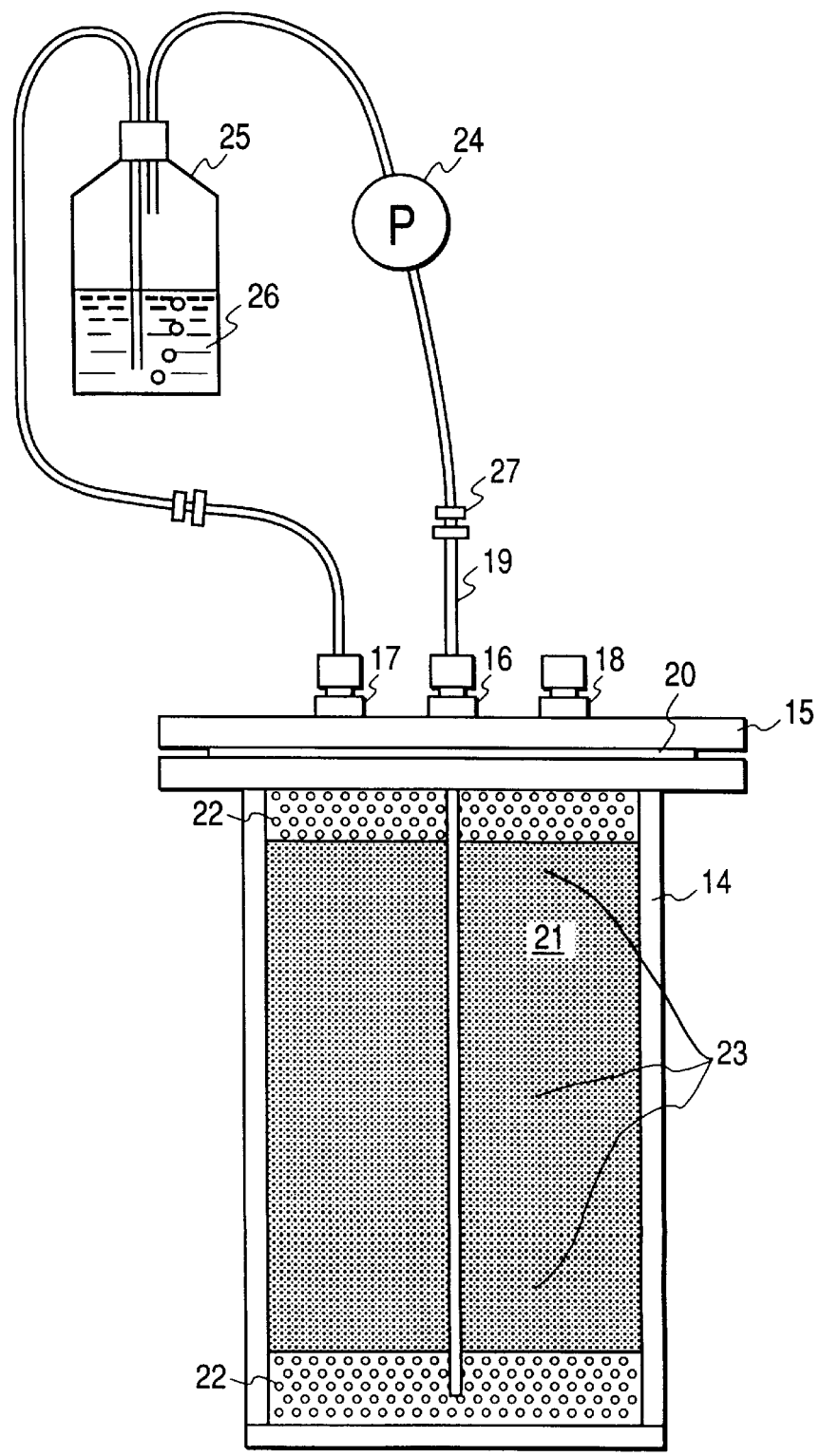
FIG. 3 is an illustrative drawing of the test apparatus used in Example 1.

An experimental apparatus as shown in FIG. 3 was assembled for this example. A 2 liter stainless steel vessel 14 with a lid was prepared. The contact faces of the vessel 14 and lid 15 were mirror-polished and a Teflon O-ring 20 was used for sealing up the vessel. An injection port 16 for the microorganism introduction, a discharge port 17 and a port 18 for sampling were provided on the lid 15 and a Teflon tube was attached to the discharge port 17 and fixed by means of a Teflon seal. Teflon coated rubber was attached to the sampling port.

Gravel with a mean diameter of 1 cm was put in the stainless vessel to a thickness of about 4 cm. The gravel layer 22 was formed so that its moisture content and porosity (void ratio) were zero and 53% respectively. Then, the microorganism injection pipe 19 was driven into the gravel layer 22. Next, 2932 g of fine sand of a specific gravity of 2.7 was filled so that the moisture content and the void ratio of the sand layer be 14% and 40% respectively. A layer of gravel with a mean diameter of 1 cm was further formed on the sand layer up to the top face of the stainless steel vessel. The gravel layer also had a moisture content of zero and a void ratio of 53%. The void volume of the soil in the stainless steel vessel is determined as follows:

For the sand layer 21, the following equation can be applied where its moisture content is 14% and 2932 g of sands of a specific gravity of 2.7 were used.

Weight of fine sand (Ws)+Weight of moisture in the fine sand layer (Ww)=2932 g

Moisture content ($\omega$=100Ww/Ws)=14

Specific gravity (Ws/Vs) 2.7

From the above, the volume (Vs) of fine sand particles in the fine sand layer is calculated:

$$Vs=2932\times100/(2.7(100+14))=952.57(cm^3)$$

The void ratio is expressed by: Total volume of the fine sand layer (V)−Vs)/Total volume of the fine sand layer and (V−Vs)/V=0.4, then;

$V=Vs/0.6=952.57/0.6=1587.6$ (cm$^3$) and

The void volume (Vv) of the sand layer=0.4 V=0.4× 1587.6=635 (cm$^3$)

Since the volume of the gravel layer is expressed by the difference between the volume of the stainless steel vessel and the volume of the fine sand layer, the volume is calculated as: 2000−1587.6=412.4 (cm$^3$).

Since the void ratio of the gravel layer is 53%, the volume of the void is calculated as: 412.4×0.53=218.5 (cm$^3$). Therefore, the total void volume of the soil in the stainless steel vessel is: 635+218.5=853.5 (cm$^3$).

The lid 15 was then set up on the stainless steel vessel 14. The microorganism-injection pipe 19 was passed through the microorganism-injection port 16 on the lid 15, and the connection part was sealed with a Teflon seal. The lid was fixed with vises to ensure sealing of the vessel.

A reservoir 25 containing 500 ml of an aqueous solution of 50 ppm TCE 26 and a pump 24 were prepared. After connecting a Teflon tube extending from the discharge port 17 through the reservoir 25 to the microorganism-injection port 16 by means of a pipe joint 27 as shown in FIG. 3, the fine sand in the vessel 14 was contaminated with a vapor of TCE sent from the reservoir by means of the pump 24, at a rate of 1 litter/min. for 25 hours. After disconnecting the TCE reservoir, a cultivation tank (not shown) of a pollutant-decomposing strain JM1 (FERM BP-5352) was connected to the microorganism-injection pipe 19 and the liquid culture of strain JM1 was slowly injected by means of compressed air. The injection volume (938.9 ml) was set to be 1.1 times as much as the total void volume of the sand and injection was continued until overflow of 445.4 ml (the presumed inherent soil water present in the void of the sand: Ww=0.14 Ws=0.14×2.7 Vs=360 ml) +superfluous amount of the culture liquid medium (0.1 Vv=85.3 ml) flowed out from the discharge port 18. The JM1 cultivation tank was removed after injection and the injection port and discharge port were sealed. All of the overflow was collected.

Figure 5:
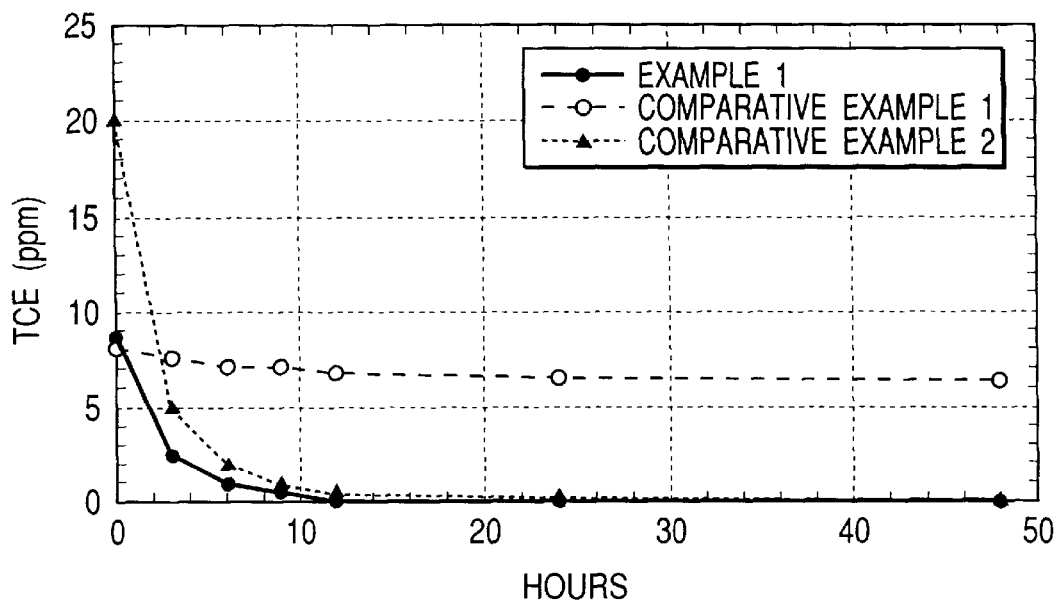
FIG. 5 is a graph showing TCE decomposition in Example 1, and Comparative Examples 1 and 2.
Figure 6:
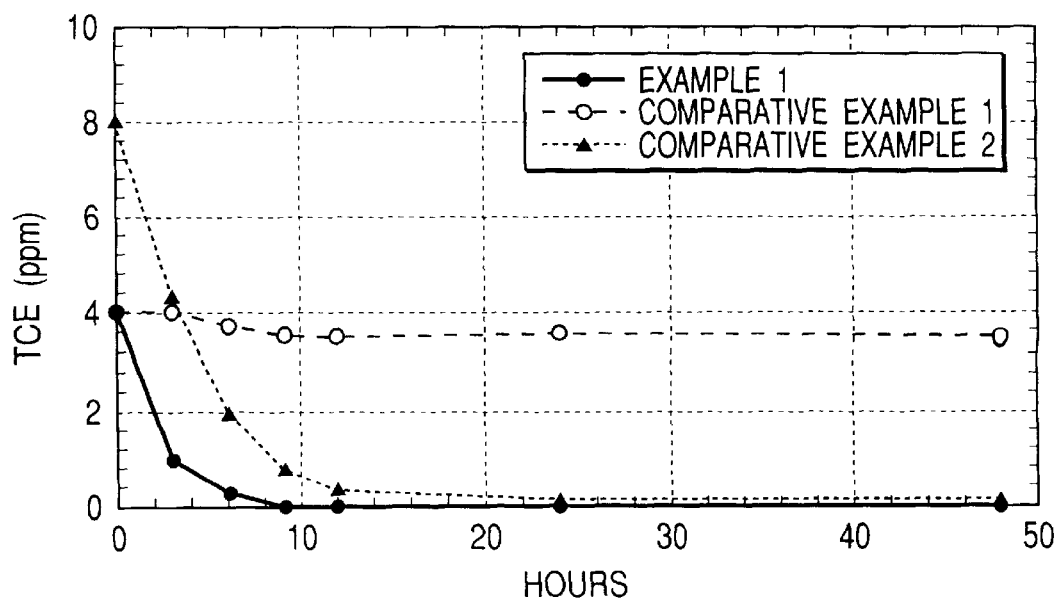
FIG. 6 is a graph showing TCE decomposition in Example 1, and Comparative Examples 1 and 2.
Figure 7:
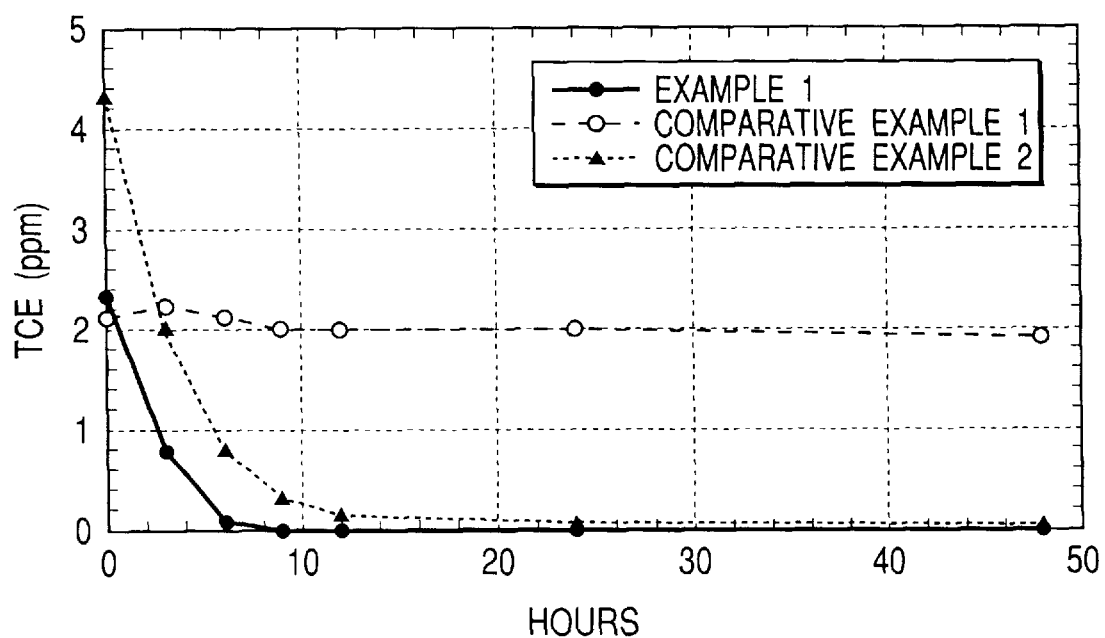
FIG. 7 is a graph showing TCE decomposition in Example 1, and Comparative Examples 1 and 2.

Immediately after the injection and every 3 hours after, a 0.5 ml liquid sample was taken from each of three sampling ports by inserting a syringe. Sampling points were the bottom (1 cm above the bottom gravel layer), the middle (5 cm above the bottom sampling point) and the top (5 cm above the middle sampling point) of the sand layer. Each liquid sample was immediately placed in a bottle containing 5 ml of n-hexane and, after stirring for 3 minutes, the n-hexane layer was collected to determine TCE concentration by ECD gas-chromatography. The results are shown in FIGS. 5 to 7 (FIG. 5: Top, FIG. 6: Middle, FIG. 7: Bottom of the sand layer). The conditions of the culture of pollutant-degrading microorganism are as follows:

A 3 day culture of strain JM1 (4.8×108 cell/ml) was diluted 2-fold with M9 medium and used for the injection.

| M9 medium | |
|---|---|
| Na$_2$HPO$_4$ | 6.2 g/l |
| KH$_2$PO$_4$ | 3.0 g/l |
| NaCl | 0.5 g/l |
| NH$_4$Cl | 1.0 g/l |
| Sodium L-glutamate | 20 g/l |

TCE concentration of the trapped overflow measured by the same method as described above was 20 ppm, indicating that the overflow contained TCE.

Comparative Example 1

A stainless steel vessel containing the soil polluted with TCE was prepared as described in Example 1. The experiment was carried out in the same manner as in Example 1, except that M 9 medium was used instead of JM1 culture. The results are also shown in FIGS. 5 to 7.

Comparative Example 2

A stainless steel vessel containing the soil polluted with TCE was prepared as shown in Example 1 and the experiment was carried out in the same manner as in Example 1 except that the injection of JM1 culture fluid was stopped when the liquid just come out from the discharge port to prevent overflow, that is, the injected amount of the culture was 493 ml ( the soil void volume (853.5 cm$^3$) subtracted with the volume of the void water (360 ml)). TCE concentrations in the sand layer in the stainless steel vessel were also measured by the same method as in Example 1. The results are shown in FIGS. 5 to 7.

EXAMPLE 2

Figure 4:
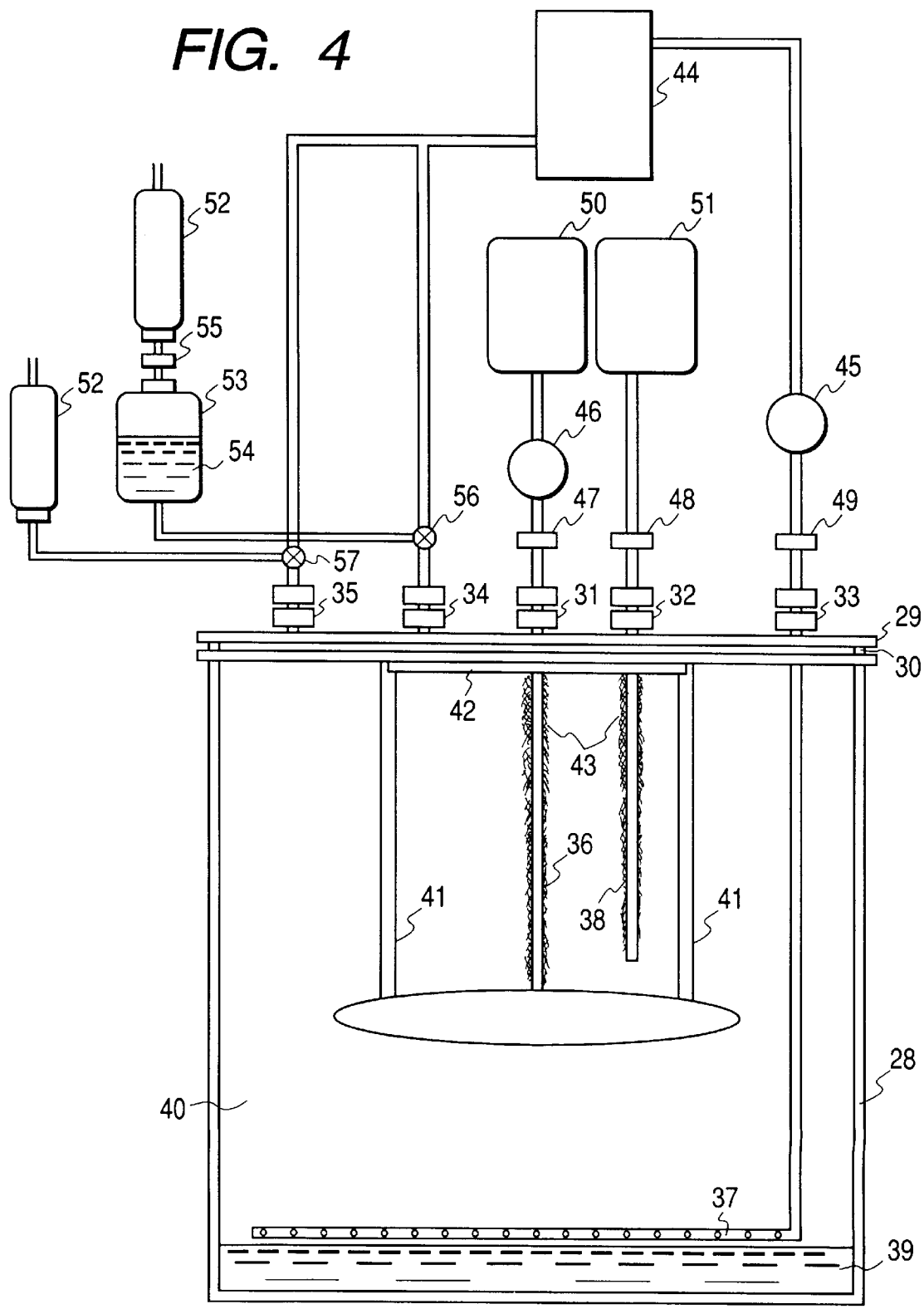
FIG. 4 is a schematic drawing showing an example of a system for carrying out the present invention.

Formation of Pollutant-decomposition System in Simulated Polluted soil—Decomposition of TCE A preliminary experiment was carried out for determining the void volume of the soil to be used in the experimental system shown in FIG. 4. A 36.6 liter stainless steel vessel 28 with a lid was prepared. The contact faces of the vessel 28 and lid 29 were mirror-polished and a Teflon O-ring 30 was used for sealing up the vessel. A soil hardening agent-injection port 31, microorganism-injection port 32 and TCE-introduction port 33, and two discharge ports 34 and 35 were provided on the lid 29. A Teflon tube was fixed to each discharge port with a Teflon seal. A stainless steel pipe of 13 mm diameter, tapered and provided with many holes of 1 mm diameter at its lower end, was use as the soil hardening agent-injection pipe 36. An L-shaped stainless steel pipe of 14 mm diameter, tapered at the end, was used as the TCE-introduction pipe 37, where several holes of about 1 mm diameter were provided in the lower part so as to inject TCE from the bottom of the stainless steel vessel. A stainless steel pipe with a diameter of 13 mm was also provided as the microorganism-introduction pipe 38.

Gravel was spread at the bottom of the stainless steel vessel to a height of about 4 cm to form a gravel layer 39. After setting the TCE-introduction pipe 37 in the layer, fine sand 40 was put in the stainless steel vessel 28 up to 200 mm from the top of the stainless steel vessel 28, and an iron pipe 41 of 112 mm diameter and 200 mm long was driven into the sand layer. To the same depth as with the iron pipe 41, was driven a soil hardening agent-injection pipe 36 into the sand layer. After further filling the vessel with sand to a height of 180 mm from the top of the stainless steel vessel 28, a microorganism-introduction pipe 38 was driven into the sand layer parallel to the soil hardening agent-injection tube 36. Finally, the vessel was filled with sand up to the rim. Gypsum 43 was injected around the soil hardening agent-injection pipe 36, microorganism-introduction tube 38 and TCE-introduction pipe 37 to fix them not to leave any space between the sand and pipes. An iron lid 42 was set on the iron pipe 41 so that the soil hardening agent injection tube 36 and microorganisms injection tube 38 come through the lid, and the Joints were fixed with gypsum. Each pipe was inserted into the port provided on the lid 29 of the stainless steel vessel and sealed with a Teflon seal. The lid was fixed with vises and the tight sealing was confirmed. The soil hardening agent-injection tube 36 was then connected to the soil hardening agent tank 50 via a valve 47 and a booster pump 46. A soil hardening agent of water glass type (made by Nitto Kagaku Co.) was used as a soil hardening agent. After injecting 400 ml of the soil hardening agent from the soil hardening agent tank 50 operating the booster pump 46 at a pressure of 5 kg/cm$^2$, the valve was closed and the stainless steel vessel was left standing for 24 hours. Then, the lid 29 was removed and the iron pipe 41 was withdrawn to find that the bottom of the iron pipe was sealed with a hardened product of the water glass type hardening agent. It was also confirmed that neither gaseous TCE, the liquid medium containing the microorganism to be used in this example nor water would not leak from the iron pipe 41.

The void volume of the soil region isolated from the surrounding environment by the iron pipe 41 was first determined. The soil volume was calculated as follows: $(11.2/2)^2 \times 3.14 \times 20 = 1969$ cm$^3$. The specific gravity, moisture content and weight of the unit volume of the soil were also determined using the samples randomly collected from three points in the isolated soil region. The results were a specific gravity of 2.7, a moisture content of 14% and an weight of the unit volume of 1.86 g/cm$^3$. There were no significant difference among these values due to the difference of the sampling points. Therefore, the total soil void volume of the isolated soil region was calculated to be 779.1 cm$^3$ from the foregoing equation (1).

The test system shown in FIG. 4 was assembled by the same method as described above. 500 ml of an aqueous solution of 400 ppm TCE was put in a reservoir 44 and this reservoir 44 was connected to the TCE-introduction port 33 via a pump 45 using a Teflon tube.

The reservoir 44 was also connected to the discharge ports 34 and 35 using Teflon tubes. Then, the pump 45 was operated to circulate gaseous TCE at a rate of 1 liter/min. for 24 hours to contaminate the sand in the vessel. After that, the Teflon tubes connected to the two discharge ports were removed and an air sample was taken by inserting a syringe through each discharge port into the sand layer to a depth of 100 mm. TCE gas concentration was assayed by FID gas chromatography (trade name: GC-14B, made by Shimadzu Co.). The result showed that the gas concentrations were 985 ppm and 950 ppm at the discharge ports 34 and 35, respectively.

After closing the valves 48 and 49 at the TCE-introduction port 33 and microorganism-injection port 32, the soil hardening agent-injection tube 36 was connected to the soil hardening agent tank 50 via the valve 47 and booster pump 46. A water glass type soil hardening agent (made by Nitto kagaku Co.) was used as the soil hardening agent. After sending 400 ml of the soil hardening agent from the soil hardening agent tank 50 with a booster pump 46 at 5 kg/cm$^2$, the valve was closed. The vessel was left standing for 24 hours. Then, the Teflon tubes connecting the discharge ports 34 and 35 and the reservoir 44 were disconnected from the reservoir tank 44 by switching the valve 56 and 57. The Teflon tube extending from the discharge port 34 was connected to a decomposition apparatus 53 containing 500 ml of the liquid culture of strain JM1 (FERM BP-5352). The strain JM1 used in the decomposition apparatus was grown by the same method as used for soil injection. The Teflon tube connected to the discharge port 35 was connected to the activated carbon column 52.

Then the liquid culture of strain JM 1 (FERM BP-5352) in the tank 51, grown in the same manner as in Example 1, was injected into the isolated region from the pipe 38. The injection volume was 934.9 ml which is 1.2 times as much as the soil void volume. Upon seeing the overflow of the liquid from the discharge port 34, injection of the liquid was stopped. The gas exhausted from the decomposition apparatus during injection was sampled from the sampling port 55 and the TCE concentration in the gas was assayed using an FID gas-chromatograph (trade name: GC 14B, made by Shimadzu Co.), showing a concentration of below the detection limit. After finishing the culture fluid injection, the valve 48 of the microorganism-injection tube was closed and the Teflon tube connected to the activated carbon column was removed, and Teflon rubber stoppers were attached to ports 34 and 35 to make them sampling ports.

Figure 8:
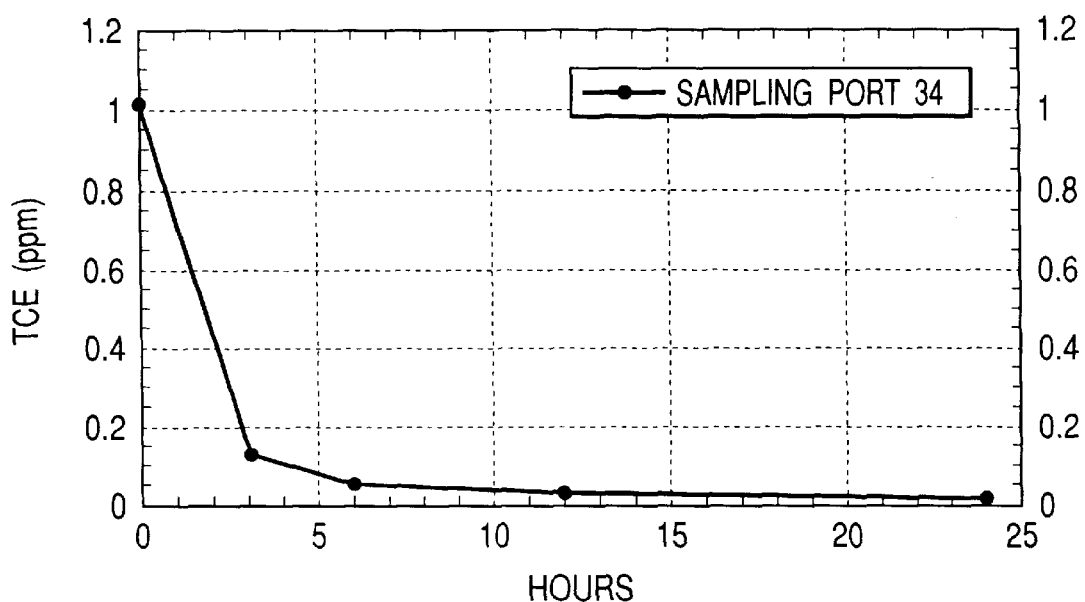
FIG. 8 is a graph showing TCE concentrations in the sample collected from the sampling hole 34 in Example 2.
Figure 9:
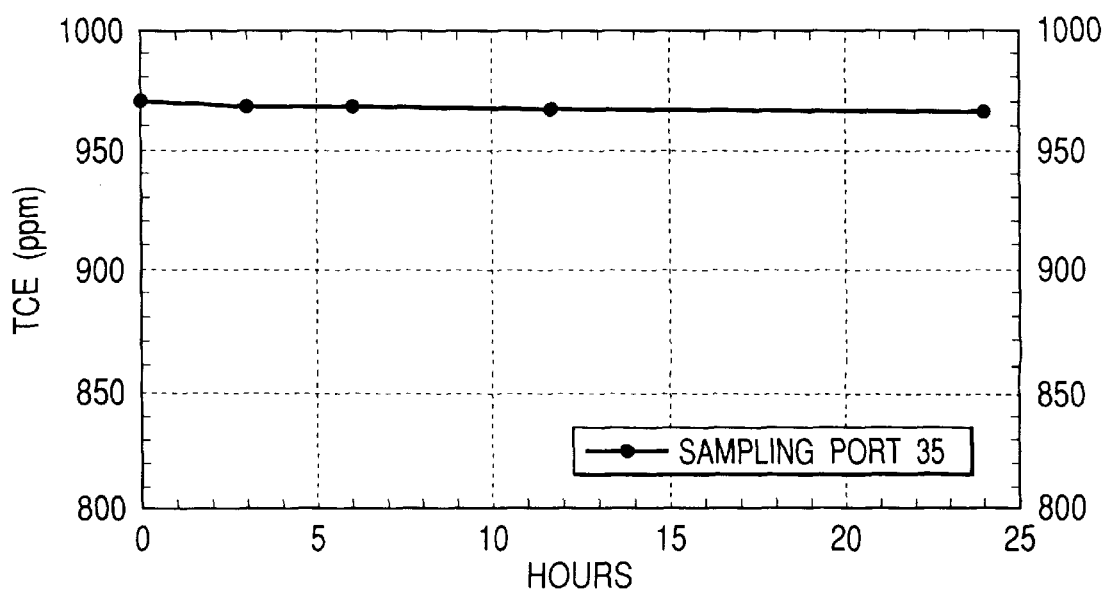
FIG. 9 is a graph showing TCE concentrations in the sample collected from the sampling port 35 in Example 2.

An aliquot of 0.5 ml of the soil water was taken every 3 hours after the culture injection, by inserting a syringe from the sampling port 34 into a depth of 100 mm, and TCE concentration was assayed by the same method as in Example 1. Gaseous samples were also collected from the sampling port 35 every 3 hours for TCE assay by FID gas chromatography. The results are shown in FIGS. 8 and 9.

At the end of the experiment, an aliquot of 0.5 ml of the liquid culture 54 in the decomposition apparatus 53 was collected and, after extracting with n-hexane, TCE concentration was determined by gas-chromatography. The TCE concentration was 0.01 ppm.

EXAMPLE 3

Two sets of simulated TCE polluted soil were prepared in the same manner as in Example 1.

A colony of strain JM1 (FERM BP-5352) grown on M9 agar medium containing 1 wt % of malic acid was transferred to M9 liquid medium containing 1 wt % of sodium glutamate and cultured with shaking at 15° C. for 2 days. The cell concentration of the liquid culture after 2 days' shaking culture was 6×10$^8$ CFU/ml. This culture was diluted 2- and 4-fold with M9 medium containing no carbon source and the dilutions were aerated with oxygen gas for 10 minutes. Dilutions were injected into the soil in the above prepared two vessels respectively, by the same method as described in Example 1.

After the injection, the injection and discharge ports were sealed and the vessel was left standing for 48 hours at 20° C. Using a syringe, samples of 0.5 ml soil water were taken from three sampling points each provided 1 cm above the lower gravel layer, 5 cm above the bottom sampling point and 5 cm above the middle sampling point. Each of the samples was immediately placed in vessels containing 5 ml n-hexane and stirred for 3 minutes. Then the hexane layer was collected to determine the TCE content by ECD gas-chromatography (trade name: GC 14B, made by Shimadzu Co.) The results are shown in Table 1 and Table 2.

EXAMPLE 4

Two sets of simulated TCE polluted soil were prepared as in Example 3. The culture liquid medium of the strain JM1 cultivated under the same condition as in Example 3 was diluted 2- and 4-fold with M9 culture medium containing no carbon source and aerated with air for 10 minutes. These dilutions were injected into the vessels containing the TCE polluted soil, and the TCE concentration in the soil was measured by the same method as described in Example 3. The results are shown in Table 1 and Table 2.

EXAMPLE 5

An experiment was carried by the same method as in Example 4, except that the culture dilutions to be injected were not aerated. The results are shown in Table 1 and Table 2.

EXAMPLE 6

An experiment was carried by the same method as in Example 4, except that the injected culture dilutions of JM1 did not overflow from the discharge port, and injection was stopped at the point when the injected liquid appeared from the discharge port. The results are shown in Table 1 and Table 2.

TABLE 1

JM1 culture (2-fold dilution)

| Sampling point | Example 3 (exposed to oxygen for 10 minutes) | Example 4 (exposed to air for 10 minutes) | Example 5 (no aeration) | Example 6 |
|---|---|---|---|---|
| Top | 0.03 (ppm) | 0.08 (ppm) | 0.23 (ppm) | 1.10 (ppm) |
| Middle | 0.02 | 0.06 | 0.09 | 0.34 |
| Bottom | not detected | 0.03 | 0.1 | 0.10 |

TABLE 2

JM1 culture (4-fold dilution)

| Sampling point | Example 3 | Example 4 | Example 5 | Example 6 |
|---|---|---|---|---|
| Top | 0.05 (ppm) | 0.09 (ppm) | 0.12 | 2.15 (ppm) |
| Middle | 0.03 | 0.08 | 0.08 | 0.41 |
| Bottom | 0.03 | 0.05 | 0.07 | 0.15 |

It was confirmed from the results in Table 1 and Table 2 that a higher degree of soil remediation could be attained by previously aerating the bacterial suspension to be injected into the soil with oxygen or air. Moreover, by previously aerating the culture fluid with oxygen or air and injecting the culture fluid at a volume 1.2 times as much as the void volume of the soil to be remedied, the top layer of which remediation is often difficult can be more efficiently purified.

What is claimed is:

1. An in situ remediation process for a region in which a volatile pollutant is retained in a soil void, comprising the steps of:
   (i) providing at least one of a liquid containing a microorganism having an activity to decompose the pollutant and a liquid containing a microorganism having ability to decompose the pollutant and an activation agent for the microorganism;
   (ii) isolating the region from a surrounding environment with a barrier which prevents the pollutant, the microorganism, the activation agent and water from permeating therethrough;
   (iii) introducing the at least one of a liquid into the region isolated in the step (ii) so that the soil void is filled with the liquid and the volatile pollutant retained in the soil void moves from the bottom to the surface of the region and is expelled from the surface of the region;
   (iv) introducing the volatile pollutant expelled from the surface of the region in the step (iii) into a pollutant decomposition apparatus and decomposing the pollutant; and
   (v) decomposing any remaining pollutant in the soil void by the microorganism in the liquid introduced in the step (iii).

2. The process according to claim 1, wherein the liquid is injected in the step (iii) in an amount 1.1 times or more a void volume of the region.

3. The process according to claim 2, wherein the liquid is injected in the step (iii) in an amount 1.2 times or more the void volume of the separated region.

4. The process according to claim 1, wherein the activation agent contains at least one of a nutrient and an inducer for the microorganism.

5. The process according to claim 1, wherein the activation agent is a culture medium which does not contain a carbon source for the microorganism.

6. The process according to claim 1, wherein the pollutant is a hydrocarbon.

7. The process according to claim 6, wherein the hydrocarbon is at least one of chlorinated aliphatic hydrocarbon compounds and aromatic compounds.

8. The process according to claim 7, wherein the chlorinated aliphatic hydrocarbon compound is at least one of dichloroethylene, trichloroethylene and tetrachloroethylene.

9. The process according to claim 1, further comprises a step for exposing the liquid to oxygen or air prior to the step (ii).

10. The process according to claim 1, wherein the microorganism to be injected in the step (ii) is in a state of the highest degradation activity for the pollutant.

11. The process according to claim 1, wherein the liquid to be injected in the step (iii) is introduced from the bottom of the isolated region.

12. An in situ remediation process for a region in which a volatile pollutant is retained in a soil void, comprising the steps of:
   (i) providing at least one of a liquid containing a microorganism having an activity to decompose the pollutant and a liquid containing a microorganism having ability to decompose the pollutant and an activation agent for the microorganism;
   (ii) building a treatment vessel in a ground so that the region is isolated from the surrounding environment, the vessel preventing the pollutant, the microorganism, the activation agent and water from permeating therethrough;
   (iii) introducing the at least one of a liquid into the region isolated in the step (ii) so that the soil void is filled with the liquid and the volatile pollutant retained in the soil void moves from the bottom to the surface of the region and is expelled from the surface of the region;
   (iv) introducing the pollutant expelled from the surface of the region in the step (iii) into a pollutant decomposition apparatus and decomposing the pollutant; and
   (v) decomposing any remaining pollutant in the soil void by the microorganism in the liquid introduced in the step (iii).

13. An in situ remediation process for a region in which a volatile pollutant is retained in a soil void, comprising the steps of:
   (i) providing at least one of a liquid containing a microorganism having an activity to decompose the pollutant and a liquid containing a microorganism having ability to decompose the pollutant and an activation agent for the microorganism;
   (ii) isolating the region from a surrounding environment with a barrier which prevents the pollutant, the microorganism, the activation agent and water from permeating therethrough;
   (iii) introducing into the region isolated in the step (ii) the at least one of a liquid in an amount 1.1 times or more larger than a void volume of the isolated region so that the soil void is filled with the liquid and the volatile pollutant retained in the soil void moves from the bottom to the surface of the region and is expelled from the surface of the region;

(iv) introducing the pollutant expelled from the surface of the region in the step (iii) into a pollutant decomposition apparatus and decomposing the pollutant; and (v) decomposing any remaining pollutant in the soil void with the microorganism in the liquid introduced in the step (iii).

14. The process according to claim 13, wherein the amount of the liquid to be injected into the region in the step (iii) is 1.2 times or more a void volume of the region isolated in the step (ii).

* * * * *

UNITED STATES PATENT AND TRADEMARK OFFICE
CERTIFICATE OF CORRECTION

PATENT NO. : 6,368,019 B2
DATED : April 9, 2002
INVENTOR(S) : Etsuko Sugawa et al.

It is certified that error appears in the above-identified patent and that said Letters Patent is hereby corrected as shown below:

Column 1,
Line 25, "have" should read -- has --
Line 55, "problem" should read -- problems --; and
Line 59, "method" should read -- methods --.

Column 2,
Line 4, "dispenses" should read -- dispenses with --;
Line 21, "even" should read -- evenly --;
Line 31, "has" should read -- have --; and
Line 42, "In situ" should read -- in situ --.

Column 3,
Line 58, "opening" should read -- openings --; and
Line 66, "way" should be deleted;
Line 67, "of" should be deleted.

Column 4,
Line 37, "an" should read -- a --;
Line 40, "Examples" should read -- ¶ [Injection of hardening agent] ¶ Examples --;
Line 47, "the" (1st occurrence) should read -- with the --; and
Line 59, "reached to" should read -- reaching --.

Column 5,
Line 7, "earth" should read -- earth's --;
Line 16, "Examples" should read -- ¶ [Pollutant decomposition equipment 12] ¶Examples --
Line 24, "Application" should read -- ¶ Remediation method] ¶ Application --; and
Line 49, "earth" should read -- earth's --;
Line 63, "earth" should read -- earth's --.

Column 7,
Line 21, "thoroughly deaerated," should read -- thorough deaeration, --; and
Line 47, "construction" should read -- the constitution --.

Column 8,
Line 39, "be" should read -- were --.

UNITED STATES PATENT AND TRADEMARK OFFICE
CERTIFICATE OF CORRECTION

PATENT NO. : 6,368,019 B2
DATED : April 9, 2002
INVENTOR(S) : Etsuko Sugawa et al.

It is certified that error appears in the above-identified patent and that said Letters Patent is hereby corrected as shown below:

Column 9,
Line 10, "were" should read -- was --;
Line 16, "litter/min." should read -- liter/min. --.

Column 10,
Line 3, "come" should read -- came --;
Line 5, "subtracted" should read -- after subtracting --;
Line 6, "with" should be deleted;
Line 50, "Joints" should read -- joints --; and
Line 67, "not" should be deleted.

Column 11,
Line 8, "an" should read -- a --;
Line 10, "difference" (both occurrence) should read -- differences --.

Column 14,
Line 12, "comprises" should read -- comprising --.

Signed and Sealed this

Sixth Day of August, 2002

Attest:

JAMES E. ROGAN
Attesting Officer  Director of the United States Patent and Trademark Office